United States Patent [19]

Kaneko

[11] Patent Number: 5,748,465
[45] Date of Patent: May 5, 1998

[54] METHOD OF PROCESSING DATA IN NUMERICALLY CONTROLLED DRIVE UNIT

[75] Inventor: Yasushi Kaneko, Tokyo, Japan

[73] Assignee: Mitsubishi Denki Kabushiki Kaisha, Tokyo, Japan

[21] Appl. No.: 632,120

[22] Filed: Apr. 15, 1996

[30] Foreign Application Priority Data

Jul. 20, 1995 [JP] Japan .................... 7-184158

[51] Int. Cl.⁶ .................................. G05B 11/18
[52] U.S. Cl. ............... 364/132; 364/131; 340/825.22; 340/825.65
[58] Field of Search ........................... 364/130–132, 364/230, 240, 260, 265, 926.9, 931.4, DIG. 1; 340/310.06, 825, 825.22; 370/431, 438; 375/356, 357

[56] References Cited

U.S. PATENT DOCUMENTS

| | | | |
|---|---|---|---|
| 4,839,817 | 6/1989 | Fujimoto | 364/474.32 |
| 5,003,476 | 3/1991 | Abe | 364/424.038 |
| 5,072,374 | 12/1991 | Sexton et al. | 364/131 |
| 5,200,745 | 4/1993 | Takai et al. | 340/825.65 |
| 5,212,798 | 5/1993 | Kanda | 364/239 |
| 5,260,631 | 11/1993 | Hayashida et al. | 318/594 |
| 5,418,721 | 5/1995 | Arai et al. | 364/424.04 |
| 5,442,273 | 8/1995 | Ikawa et al. | 318/799 |
| 5,491,816 | 2/1996 | Matoba et al. | 395/181 |
| 5,555,548 | 9/1996 | Iwai et al. | 395/356 |
| 5,572,419 | 11/1996 | Nishimura | 364/131 |

OTHER PUBLICATIONS

Meldas AC Servo MR-S/O Series, BNP-B3615B.

*Primary Examiner*—Emanuel T. Voeltz
*Assistant Examiner*—Bryan Bui
*Attorney, Agent, or Firm*—Sughrue, Mion, Zinn, Macpeak & Seas, PLLC

[57] ABSTRACT

Detection data of an amount of control is directly monitored and a correction control command is directly outputted by a plurality of numerically controlled drive units 4, 5, 6 via the common sending line 3 and the common receiving line 2 without using NC 1. When a dedicated communication line 30 is used, detection data of an amount of control is directly monitored and a correction control command is directly outputted without using NC 1. The data is processed by the numerically controlled drive units 4, 5, 6 which are controlled and driven at a higher speed than the speed determined by the control cycle of NC 1, and the synchronizing control is carried out.

14 Claims, 9 Drawing Sheets

METHOD OF PROCESSING DATA IN NUMERICALLY CONTROLLED DRIVE UNIT

BACKGROUND OF THE INVENTION

1. Field of the Invention

The present invention relates to a numerically controlled drive unit, and more particularly relates to a numerically controlled drive unit in which a synchronized operation is conducted highly accurately at high speed by the communication of data between the drive units.

2. Description of the Related Art

FIG. 12 shows an arrangement view of a conventional numerical control system. In the drawing, reference numeral 1 denotes a numerical control unit, which may be referred to as NC in this specification, hereinafter. Reference numeral 2 is a common receiving line through which a driver 7 of NC is connected with receivers 12 to 14 of the drive units, and the common receiving line 2 is a data sending line through which data is sent from NC to the drive units. Reference numeral 3 is a common sending line through which a receiver 8 of NC is connected with drivers 9 to 11 of the drive units, and the common sending line 3 is a data sending line through which data is sent from the drive units to NC. Reference numerals 4 to 6 are numerically controlled drive units which are drive control units to control motors 15 to 17 by means of data communication between NC 1 and the numerically controlled drive units through the common receiving line 2 and the common sending line 3.

NC 1 sends a parameter for the drive unit to the common receiving line 2 in the process of initialization. NC 1 also sends a control command to the common receiving line 2 in every control cycle (control period). The numerically controlled drive units 4 to 6 control the motors 15 to 17 in accordance with the control command.

The numerically controlled drive units 4 to 6 send the detection data of a position, speed and electric current to the common sending line 3 in synchronization with the NC control cycle. Also the numerically controlled drive units 4 to 6 send the diagnosis data of a warning and an alarm in synchronization with the NC control cycle.

FIG. 13 is a control processing time chart showing an example of the sending and receiving operation conducted between NC 1 and the numerically controlled drive units 4 to 6 in one NC control cycle.

The conventional numerical control system is constituted as described above. Accordingly, when two or more shafts are synchronously operated, NC 1 sends control commands to the numerically controlled drive units 4 to 6 in the condition of an open loop, or alternatively NC 1 corrects the control commands in accordance with the detection data of a position, speed and electric current sent from the numerically controlled drive units 4 to 6 so that the synchronization property can be maintained, and the control commands thus corrected are then sent to the numerically controlled drive units 4 to 6 being behind time by one cycle.

Due to the foregoing, when the control properties are different among the synchronous drive units, or when a specific synchronous drive shaft is given an impact load, the synchronous error is increased.

SUMMARY OF THE INVENTION

The present invention has been accomplished to solve the above problems, and therefore an object of the present invention is to realize a highly accurate synchronous operation at high speed by allowing the numerically controlled drive units, which are controlled and driven at a higher speed than that of the control cycle of NC, to be directly controlled by means of data communication conducted with each other by the numerically controlled drive units without using NC.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit; and receiving the detection data sent from other drive control units in accordance with the control period of the numerical control unit, by the numerical control unit through the data receiving line so as to correct a synchronization error caused between the drive control units before the successive control period of the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the data receiving line in accordance with the control period of the numerical control unit, the monitoring unit receives the detection data of the unit to be monitored from the data receiving line, and the monitoring unit compares the received detection data with the detection data of the drive unit controlled by the monitoring unit so as to correct a synchronization error caused between the drive section controlled by the monitoring unit and the drive section controlled by the unit to be monitored.

The present invention is to provide a method of processing data in a numerically controlled drive unit in which at least one drive control unit is made to be a master unit and other drive control units are made to be slave units, the slave units send the detection data of their drive sections to the data receiving line in accordance with the control period of the numerical control unit, the master unit receives the detection data of the slave unit from the data receiving line, and the master unit compares the received detection data with the detection data of the drive unit controlled by the master unit itself, a correction command for correcting a synchronization error caused between the drive section controlled by the master unit and the drive section controlled by the slave unit is sent to the data receiving line in a period of time when a plurality of other drive control units do not send data to the numerical control unit, and the slave unit receives the correction command from the data receiving line so as to correct the synchronization error of the drive unit controlled by the slave unit itself.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command for correcting the synchronization error is sent to the data receiving line irrespective of the control period of the numerical control unit in a period of time when a plurality of drive control units are not sending data to the numerical control unit, and the slave unit receives the correction signal from the data receiving line so as to correct the synchronization error of the drive section controlled by the slave unit.

The method of processing data in a numerically controlled drive unit comprises the steps of: sending a control command allotted to each drive control unit from the numerical control unit to each drive control unit in every predetermined control period; controlling a drive section of each drive control unit by each drive control unit itself in accordance with the control command allotted to it; and sending the detection data of the drive section to the data receiving line in accordance with the control period of the numerical control unit, wherein a dedicated data line for connecting the data sending section with the data receiving section, which is provided differently from the data line of the numerical control unit, is provided in each drive control unit, so that data can be sent and received by the plurality of drive control units independently from the sending and receiving of data conducted through the data sending line or data receiving line between the numerical control unit and the plurality of drive control units in a predetermined control period of the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the dedicated data line, the monitoring unit receives the detection data of the unit to be monitored from the dedicated data line, and the monitoring unit compares the received detection data with the detection data of the drive unit controlled by the monitoring unit so as to correct a synchronization error caused between the drive section controlled by the monitoring unit and the drive section controlled by the unit to be monitored.

The present invention is to provide a method of processing data in a numerically controlled drive unit in which at least one drive control unit is made to be a master unit and other drive control units are made to be slave units, the slave units send the detection data of their drive sections to the dedicated data line, the master unit receives the detection data of the slave unit from the dedicated data line, and the master unit compares the received detection data with the detection data of the drive unit controlled by the master unit itself, a correction command for correcting a synchronization error caused between the drive section controlled by the master unit and the drive section controlled by the slave unit is sent to the dedicated data line, and the slave unit receives the correction command from the dedicated data line so as to correct the synchronization error of the drive unit controlled by the slave unit itself.

The present invention is to provide a method of processing data in a numerically controlled drive unit in which at least one of the plurality of drive control units is made to be a master unit and other drive control units are made to be slave units, the master unit estimates a synchronization error caused between the drive section controlled by the slave unit and the drive section controlled by the master unit itself from the control command sent from the numerical control unit and the detection data of the drive section controlled by the master unit itself, a correction command for correcting the synchronization error is sent to the dedicated data line, and the slave unit receives the correction signal from the dedicated data line so as to correct the synchronization error of the drive section controlled by the slave unit.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit sends the detection data to the data sending line irrespective of a predetermined control period in which the numerical control unit sends a control command to the plurality of drive control units while data is not sent and received between the numerical control unit and the plurality of drive control units in the case where an error caused between a control command sent from the numerical control unit and an amount of control of the drive section controlled by the drive control unit exceeds a predetermined value, and other drive control unit receives the detection data from the data receiving line, and the drive control unit compares the detection data with the detection data of the control section controlled by the drive control unit itself so that the synchronization error of its drive unit can be corrected.

The method of processing data in a numerically controlled drive unit of the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit in the plurality of drive control units is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command to correct this synchronization error is sent to the data sending line irrespective of a predetermined control period in which the numerical control unit sends a control command to the plurality of drive control units and in a period of time in which data is not sent and received between the numerical control unit and the plurality of drive control units, and the slave unit receives the correction command from the data sending line so as to correct the synchronization error of the drive section controlled by the slave unit.

The present invention is to provide a method of processing data in a numerically controlled drive unit in which the numerical control unit designates a specific drive control unit in the plurality of drive control units as a master unit or a monitor unit in the process of initialization and also designates another specific drive control unit as a slave unit or a unit to be monitored, and a relation between the master unit or monitor unit and the slave unit or unit to be monitored is maintained in a control period of normal operation after the completion of the initialization process.

The present invention is to provide a method of processing data in a numerically controlled drive unit in which the numerical control unit designates a specific drive control unit in the plurality of drive control units as a master unit or a monitor unit in accordance with a control parameter sent from the numerical control unit to the plurality of drive control units in every control period of normal operation and also designates another specific drive control unit as a slave unit or a unit to be monitored, and a relation between the master unit or the monitor unit and the slave unit or the unit to be monitored is capable of being changed in accordance with the control parameter.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit; and receiving the detection data sent from other drive control units in accordance with the control period of the numerical control unit, by the numerical control unit through the data receiving line so as to correct a synchronization error caused between the drive control units before the successive control period of the numerical control unit. Accordingly, the plurality of drive control units exchange the detection data with each other at a higher speed than the speed corresponding to the predetermined period of the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the data receiving line in accordance with the control period of the numerical control unit, the monitoring unit receives the detection data of the unit to be monitored from the data receiving line, and the monitoring unit compares the received detection data with the detection data of the drive unit controlled by the monitoring unit so as to correct a synchronization error caused between the drive section controlled by the monitoring unit and the drive section controlled by the unit to be monitored. Accordingly, the monitor unit and the unit to be monitored correct a synchronization error at a speed higher than the speed corresponding to the predetermined period of the numerical control unit.

The present invention is to provide a method of processing data in a numerically controlled drive unit in which at least one drive control unit is made to be a master unit and other drive control units are made to be slave units, the slave units send the detection data of their drive sections to the data receiving line in accordance with the control period of the numerical control unit, the master unit receives the detection data of the slave unit from the data receiving line, and the master unit compares the received detection data with the detection data of the drive unit controlled by the master unit itself, a correction command for correcting a synchronization error caused between the drive section controlled by the master unit and the drive section controlled by the slave unit is sent to the data receiving line in a period of time when a plurality of other drive control units do not send data to the numerical control unit, and the slave unit receives the correction command from the data receiving line so as to correct the synchronization error of the drive unit controlled by the slave unit itself. Accordingly, the master unit and the slave unit can take a share in the correction work in such a manner that the master unit makes the correction command and the slave unit conducts the correction work according to the correction command.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command for correcting the synchronization error is sent to the data receiving line irrespective of the control period of the numerical control unit in a period of time when a plurality of drive control units are not sending data to the numerical control unit, and the slave unit receives the correction signal from the data receiving line so as to correct the synchronization error of the drive section controlled by the slave unit. Accordingly, it is possible to conduct the correction work using an estimation value of the error before the actual generation of a synchronization error between the master unit and the slave unit.

The method of processing data in a numerically controlled drive unit comprises the steps of: sending a control command allotted to each drive control unit from the numerical control unit to each drive control unit in every predetermined control period; controlling a drive section of each drive control unit by each drive control unit itself in accordance with the control command allotted to it; and sending the detection data of the drive section to the data receiving line in accordance with the control period of the numerical control unit, wherein a dedicated data line for connecting the data sending section with the data receiving section, which is provided differently from the data line of the numerical control unit, is provided in each drive control unit, so that data can be sent and received by the plurality of drive control units independently from the sending and receiving of data conducted through the data sending line or data receiving line between the numerical control unit and the plurality of drive control units in a predetermined control period of the numerical control unit. Accordingly, the plurality of drive control units exchange the detection data with each other independently from the data sending and receiving conducted between the drive control units and the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the dedicated data line, the monitoring unit receives the detection data of the unit to be monitored from the dedicated data line, and the monitoring unit compares the received detection data with the detection data of the drive unit controlled by the monitoring unit so as to correct a synchronization error caused between the drive section controlled by the monitoring unit and the drive section controlled by the unit to be monitored. Accordingly, the monitor unit and the unit to be monitored send and receive data at high speed independently from the numerical control unit, so that the synchronization error can be corrected at high speed.

The present invention is to provide a method of processing data in a numerically controlled drive unit in which at least one drive control unit is made to be a master unit and other drive control units are made to be slave units, the slave units send the detection data of their drive sections to the dedicated data line, the master unit receives the detection data of the slave unit from the dedicated data line, and the master unit compares the received detection data with the detection data of the drive unit controlled by the master unit itself, a correction command for correcting a synchronization error caused between the drive section controlled by the master unit and the drive section controlled by the slave unit is sent to the dedicated data line, and the slave unit receives the correction command from the dedicated data line so as to correct the synchronization error of the drive unit controlled by the slave unit itself. Accordingly, the master unit and the slave unit can take a share in the correction work in such a manner that the master unit makes the correction command and the slave unit conducts the correction work according to the correction command, and data can be exchanged at high speed independently from data exchange conducted between the numerical control unit and the master unit and also between the numerical control unit and the slave unit.

The present invention is to provide a method of processing data in a numerically controlled drive unit in which at least one of the plurality of drive control units is made to be a master unit and other drive control units are made to be slave units, the master unit estimates a synchronization error caused between the drive section controlled by the slave unit and the drive section controlled by the master unit itself from the control command sent from the numerical control unit and the detection data of the drive section controlled by the master unit itself, a correction command for correcting the synchronization error is sent to the dedicated data line, and the slave unit receives the correction signal from the dedicated data line so as to correct the synchronization error of the drive section controlled by the slave unit. Accordingly, it is possible to conduct the correction work to correct a synchronization error at high speed using an estimation value of the error before the actual generation of a synchronization error between the master unit and the slave unit is corrected independently from the data exchange conducted between the numerical control unit and the master unit and also between the numerical control unit and the slave unit.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit sends the detection data to the data sending line irrespective of a predetermined control period in which the numerical control unit sends a control command to the plurality of drive control units while data is not sent and received between the numerical control unit and the plurality of drive control units in the case where an error caused between a control command sent from the numerical control unit and an amount of control of the drive section controlled by the drive control unit exceeds a predetermined value, and other drive control unit receives the detection data from the data receiving line, and the drive control unit compares the detection data with the detection data of the control section controlled by the drive control unit itself. Accordingly, the plurality of drive units can take the detection data from an opponent drive control unit synchronously operated at high speed, irrespective of the predetermined control period in which the numerical control unit sends a control command to the plurality of drive control units.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit in the plurality of drive control units is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command to correct this synchronization error is sent to the data sending line irrespective of a predetermined control period in which the numerical control unit sends a control command to the plurality of drive control units and in a period of time in which data is not sent and received between the numerical control unit and the plurality of drive control units, and the slave unit receives the correction command from the data sending line so as to correct the synchronization error of the drive section controlled by the slave unit. Accordingly, before an actual synchronization error is caused between the master unit and the slave unit, correction can be conducted at high speed using an estimation value of the error irrespective of the predetermined control cycle in which the numerical control unit sends a control command to the plurality of drive control units.

The present invention is to provide a method of processing data in a numerically controlled drive unit in which the numerical control unit designates a specific drive control unit in the plurality of drive control units as a master unit or a monitor unit in the process of initialization and also designates another specific drive control unit as a slave unit or a unit to be monitored, and a relation between the master unit or monitor unit and the slave unit or unit to be monitored is maintained in a control period of normal operation after the completion of the initialization process. Accordingly, in the process of initialization, a specific drive control unit is only once designated as a master unit, monitor unit, slave unit or unit to be monitored.

The present invention is to provide a method of processing data in a numerically controlled drive unit in which the numerical control unit designates a specific drive control unit in the plurality of drive control units as a master unit or a monitor unit in accordance with a control parameter sent from the numerical control unit to the plurality of drive control units in every control period of normal operation and also designates another specific drive control unit as a slave unit or a unit to be monitored, and a relation between the master unit or the monitor unit and the slave unit or the unit to be monitored is capable of being changed in accordance with the control parameter. Accordingly, a specific drive control unit is freely designated by the control parameter as a master unit, monitor unit, slave unit or unit to be monitored.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

DETAILED DESCRIPTION OF THE PREFERRED EMBODIMENTS

First Embodiment

Figure 1:
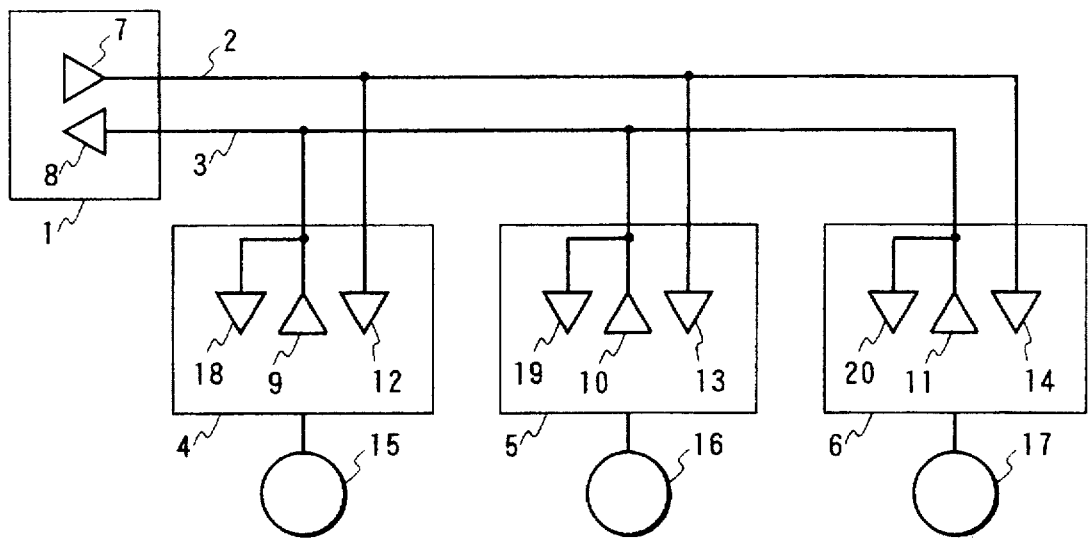
FIG. 1 is an arrangement view of the system in which the numerically controlled drive unit of the first embodiment of the present invention is used.

FIG. 1 is an arrangement view of the apparatus of the first embodiment. In the system shown in FIG. 1, there are provided 3 numerically controlled drive units. In same manner as that of the conventional apparatus, in the normal operation, NC 1 sends a control command from the driver 7 to the common receiving line 2, which is a data sending line, in every control cycle. The numerically controlled drive units 4, 5, 6 read a control command allotted to each unit with the receivers 12, 13, 14, so that the motors 15, 16, 17 can be respectively controlled.

Figure 13:
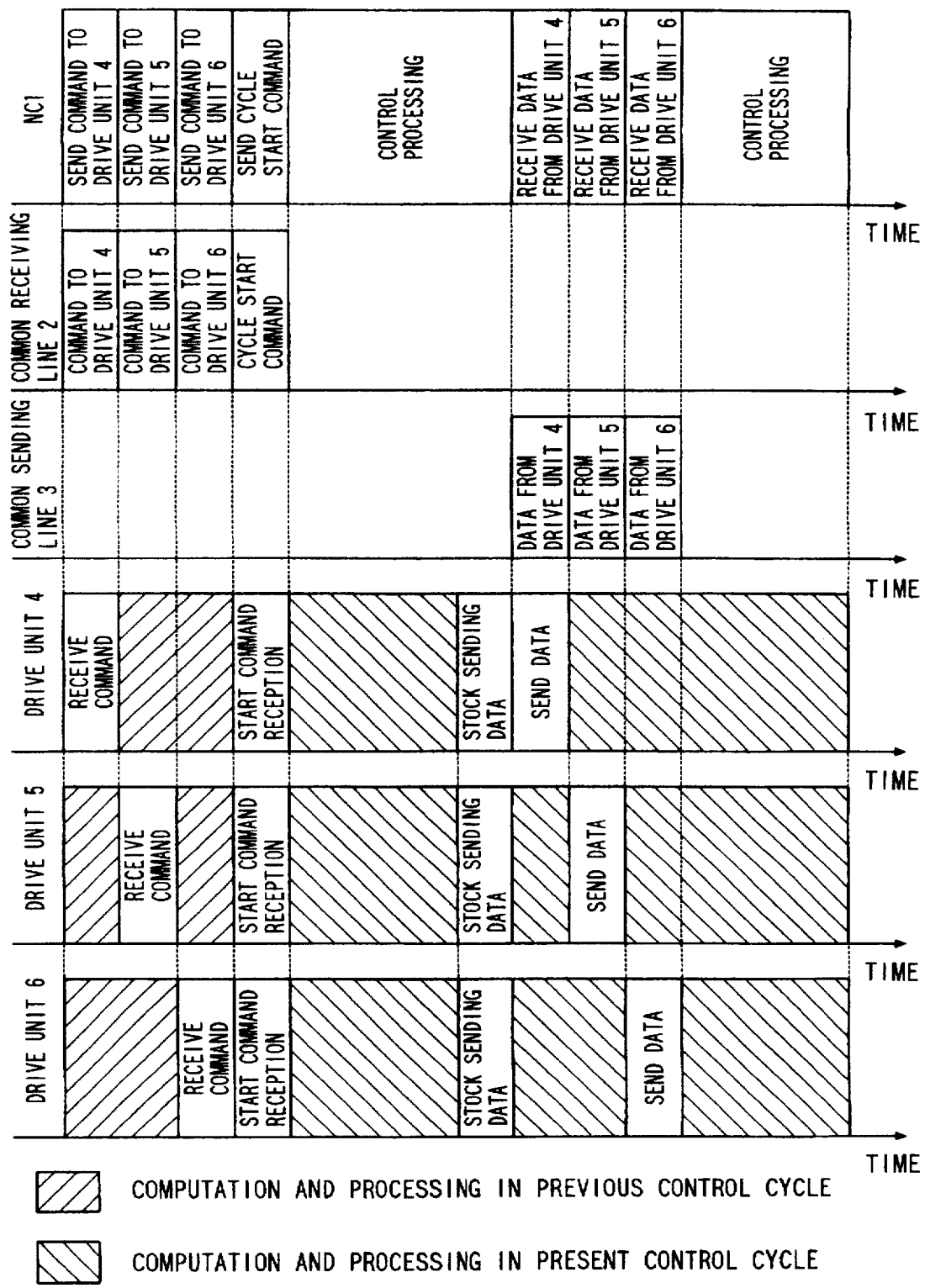
FIG. 13 is a time chart of the data sending and receiving and the processing of control conducted in the system in which the numerically controlled drive unit of the prior art is used.

The numerically controlled drive units 4, 5, 6 detect a position, speed and electric current. These detected position, speed and electric current are used as detection data. A warning and an alarm are used as diagnosis data. These data are sent from the drivers 9, 10, 11 to the common sending line 3 which is a data receiving line. The data is sent to NC 1 from each numerically controlled drive unit being scheduled as shown in FIG. 13 so that the interference of data can be prevented.

NC 1 receives the data by the receiver 8. The thus received data is used as a control command in the successive control cycle, and an alarm and a warning are displayed according to the data.

As described above, in this system, data is sent to NC 1 from the numerically controlled drive units 4, 5, 6 being scheduled, so that the data of other numerically controlled drive units can be monitored by the receivers 18, 19, 20 connected to the common receiving line 3 without using NC 1.

Further, the numerically controlled drive units 4, 5, 6 are controlled and driven at a higher speed than that of the control cycle of NC 1. Accordingly, before the successive control cycle of NC 1, the monitored data can be processed and the control operation can be conducted synchronously with the numerically controlled drive unit that has been monitored.

Second Embodiment

Figure 2:
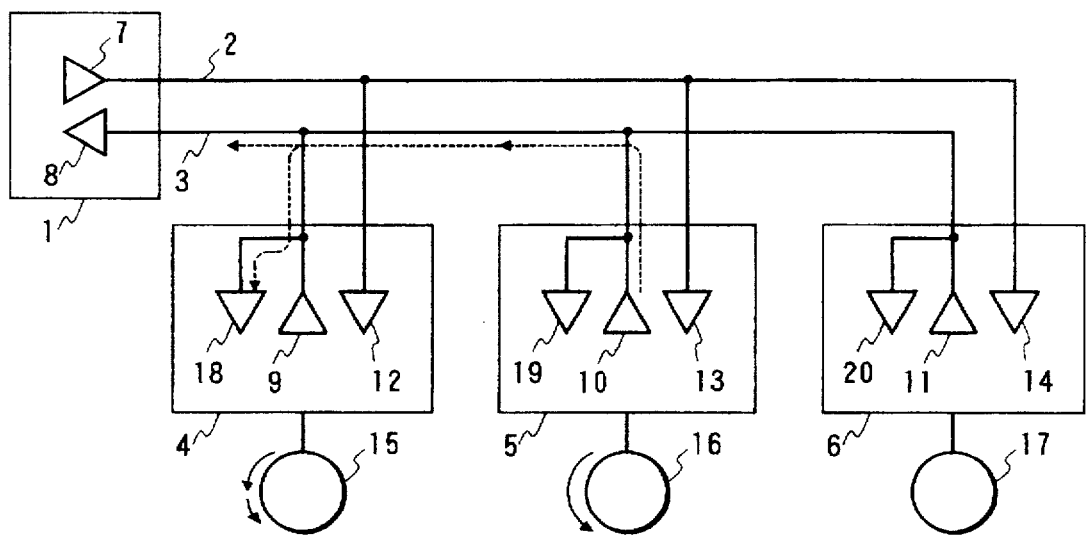
FIG. 2 is an arrangement view of the system in which the numerically controlled drive unit of the second embodiment of the present invention is used.

FIG. 2 is a schematic illustration to explain the second embodiment. As an arrangement view, FIG. 2 is the same as the arrangement view of the first embodiment shown in FIG. 1. Explanations will be made on the assumption that the numerically controlled drive units 4 and 5 are operated synchronously with each other in this system arrangement.

In the same manner as that of the conventional system, the numerically controlled drive unit 5 detects a position, speed and electric current. These detected position, speed and electric current are used as detection data. A warning and an alarm are used as diagnosis data. The data is sent from the driver 10 to the common sending line 3. At this time, the numerically controlled drive unit 4 operates the receiver 18 connected with the common sending line 3, so that the data sent from the numerically controlled drive unit 5 can be read. A flow of this data is shown by a broken line in FIG. 2.

The numerically controlled drive unit 4 compares the data of the numerically controlled drive unit 5 with the data of an amount of control of the numerically controlled drive unit 4 itself. According to the result of the comparison, the motor 15 is controlled so that a synchronous operation error caused between the numerically controlled drive units 4 and 5 can be corrected.

Since this series of processing is conducted in one control cycle of NC 1, the numerically controlled drive units 4 and 5 can be synchronously operated at high speed with high accuracy.

This embodiment is characterized as follows. When the motor of the monitor drive unit quickly responds with respect to the drive unit to be monitored in the first embodiment, the monitor drive unit conducts a synchronous correcting operation, so that an accurate correcting operation can be realized at high speed.

Third Embodiment

Figure 3:
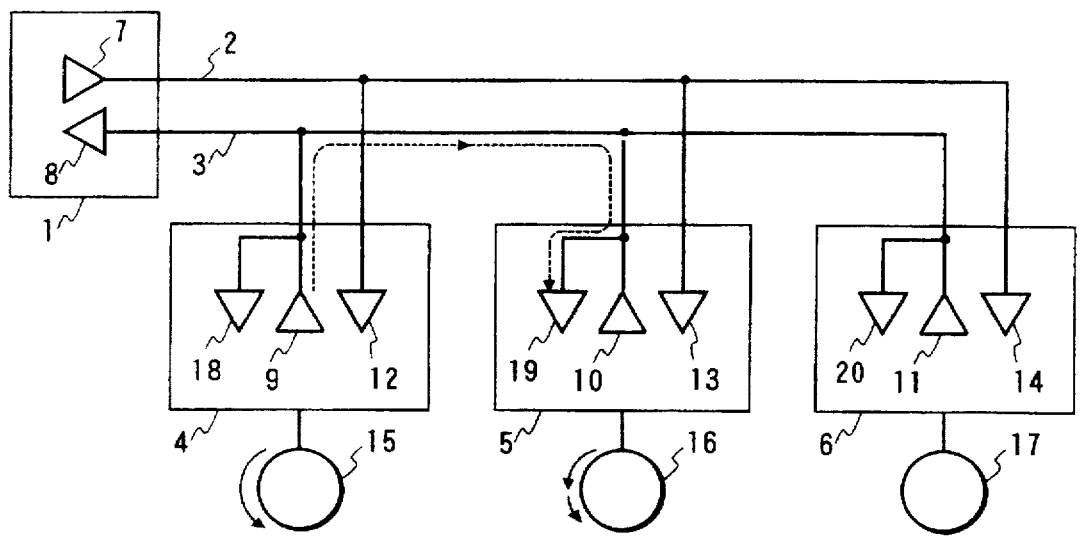
FIG. 3 is an arrangement view of the system in which the numerically controlled drive unit of the third embodiment of the present invention is used.

FIG. 3 is a schematic illustration to explain the third embodiment. As an arrangement view, FIG. 3 is the same as the arrangement view of the first embodiment shown in FIG. 1. Explanations will be made on the assumption that the numerically controlled drive units 4 and 5 are operated synchronously with each other, and the numerically controlled drive unit 4 is a master drive unit, and the numerically controlled drive unit 5 is a slave unit in this system arrangement.

In this system, in the same manner as that of the second embodiment, data sent to the common sending line 3 from the driver 10 of the numerically controlled drive unit 5 is read by the receiver 18 of the numerically controlled drive unit 4.

The numerically controlled drive unit 4 compares the data of the numerically controlled drive unit 5 with the data of an amount of control of the numerically controlled drive unit 4 itself. The numerically controlled drive unit 4 sends a control command for correcting a synchronization error with respect to the numerically controlled drive unit 5 from the driver 9 to the common sending line 3 in a period of time in which any numerically controlled drive units do not send data to NC 1.

The numerically controlled drive unit 5 reads the control command on the common sending line by the receiver 19, so that the motor 16 is controlled by this control command. In FIG. 3, a flow of this correction control command is shown by a broken line.

Since this series of processing is conducted in one control cycle of NC 1, the numerically controlled drive units 4 and 5 can be synchronously operated at high speed with high accuracy.

In the second embodiment, the monitor drive unit that has received the detection data conducts the computation of synchronous correction and then carries out a correcting processing operation. Accordingly, a heavy processing load is given to the monitor drive unit. However, in this embodiment, the master drive unit that has received the detection data sends a correction control command obtained by the synchronous correction computation, that is, the master drive unit does not conduct the correcting processing operation by itself. Therefore, the processing load is lighter than that of the second embodiment.

Fourth Embodiment

Figure 4:
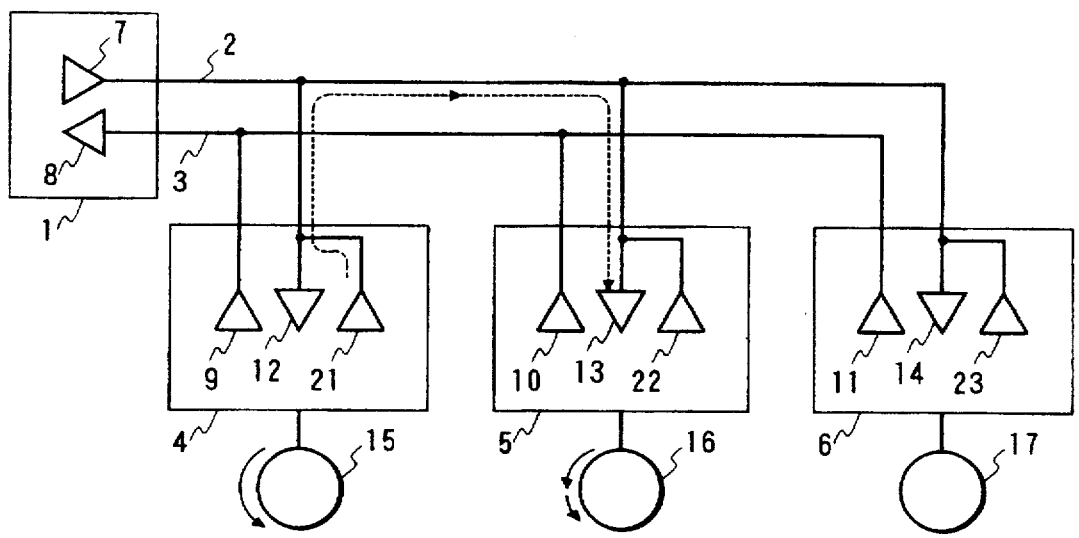
FIG. 4 is an arrangement view of the system in which the numerically controlled drive unit of the fourth and fifth embodiments of the present invention is used.

FIG. 4 is an arrangement view of the apparatus of the fourth embodiment. In the system shown in FIG. 4, there are provided 3 numerically controlled drive units. In same manner as that of the conventional apparatus, in the normal operation, NC 1 sends a control command from the driver 7 to the common receiving line 2 in every control cycle. The numerically controlled drive units 4, 5, 6 read a control command allotted to each unit with the receivers 12, 13, 14, so that the motors 15, 16, 17 are respectively controlled.

The numerically controlled drive units 4, 5, 6 detect a position, speed and electric current. The detected data of a position, speed and electric current is used as detection data. A warning and an alarm are used as diagnosis data. The data is sent from the drivers 9, 10, 11 to the common sending line 3. The data is sent to NC 1 from each numerically controlled drive unit being scheduled so that the interference of data can be prevented.

Explanations will be made on the assumption that the numerically controlled drive units 4 and 5 are operated synchronously with each other.

When an error between the control command and the amount of control of the numerically controlled drive unit 4 is increased by some reasons, for example, when an error between the control command and the amount of control of the numerically controlled drive unit 4 is increased by a heavy impact load, it is natural that a synchronization error between the numerically controlled drive units 4 and 5 is increased.

At this time, in a period of time in which NC 1 does not send data to any numerically controlled drive units, the numerically controlled drive unit 4 sends the detection data of an amount of control of itself to the common receiving line 2 from the driver 21 irrespective of the data sending time in the control cycle of NC. In this case, it is possible to send the detection data from the driver 21 to the common receiving line 3, however, it is advantageous to send the detection data from the driver 21 to the common sending line 2 because the common receiving line 2 is less crowded than the common sending line 3.

The numerically controlled drive unit 5 reads the detection data that has appeared on the common receiving line by the receiver 13 and compares the detection data with the data of an amount of control of itself and controls the motor 16 so that the synchronization error can be corrected. A flow of the detection data is shown by a broken line in FIG. 4.

Since the numerically controlled drive unit 5 is controlled and driven at a higher speed than the speed determined by the control cycle of NC 1, the numerically controlled drive unit 5 can be synchronized with the numerically controlled drive unit which has sent the detection data, before the successive control cycle of NC 1.

In the second and third embodiments, the drive unit to conduct a synchronizing correcting computation can read the data only at the data sending time in NC control cycle. However, in this embodiment, when an error between the control command sent from NC 1 and the amount of control is increased before a synchronization error is increased, the detection data is immediately sent by the numerically controlled drive unit 4. Accordingly, it is possible to start the synchronizing correcting operation at a point of time earlier than that of the first or third embodiment. Consequently, it is possible to conduct a synchronizing correction at high speed with high accuracy.

Fifth Embodiment

Referring to FIG. 4, the fifth embodiment will be explained below. In this system arrangement, the numerically controlled drive units 4 and 5 are operated synchronously with each other, and the numerically controlled drive unit 4 is a master drive unit and the numerically controlled drive unit 5 is a slave drive unit.

When an error between the control command and the amount of control of the numerically controlled drive unit 4 is increased by some reasons, for example, when an error between the control command and the amount of control of the numerically controlled drive unit 4 is increased by a heavy impact load, it is natural that a synchronization error between the numerically controlled drive units 4 and 5 is increased.

The numerically controlled drive unit 4 estimates a synchronization error generated by an error between its control command and the detection data of an amount of control. At this time, in a period of time in which NC 1 does not send data to any numerically controlled drive units, the numerically controlled drive unit 4 sends a correction control command with respect to the numerically controlled drive unit 5 to the common receiving line 2 from the driver 21 irrespective of the data sending time in NC control cycle.

The numerically controlled drive unit 5 reads a control command directed to it that has appeared on the common receiving line by the receiver 13. By the correction control command, the motor 16 is controlled. In this case, a flow of the correction control command is shown by a broken line in FIG. 4, which is different from the flow of the fourth embodiment.

Since this series of processing is conducted in one control cycle of NC 1, the numerically controlled drive units 4 and 5 can be synchronously operated at high speed with high accuracy.

In the fourth embodiment, the monitor drive unit that has received the detection data conducts computation of synchronizing correction and then carries out a correcting processing operation. Accordingly, a heavy processing load is given to the monitor drive unit. However, in this embodiment, the numerically controlled drive unit 4 on the sending side estimates a synchronization error generated by the error between its control command and the detection data of the amount of control and sends a correction control command. Accordingly, it is not necessary to conduct a synchronizing correcting computation in the numerically controlled drive unit 5 on the receiving side. Therefore, the processing load can be reduced lighter than that of the fourth embodiment.

Sixth Embodiment

Figure 5:
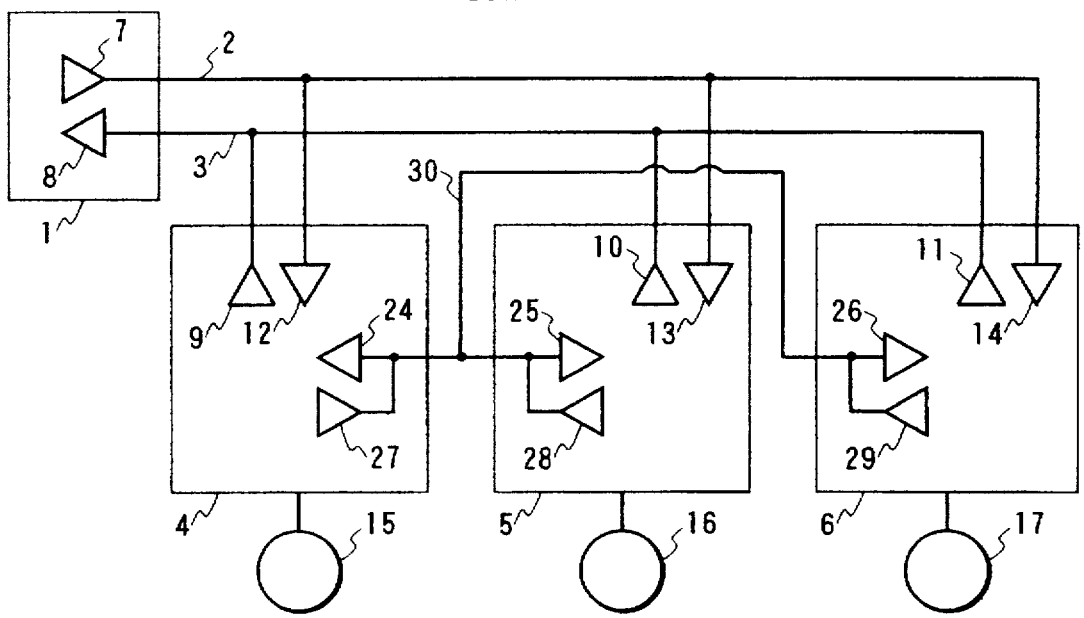
FIG. 5 is an arrangement view of the system in which the numerically controlled drive unit of the sixth embodiment of the present invention is used.

FIG. 5 is an arrangement view of the sixth embodiment. FIG. 5 shows a system having 3 numerically controlled drive units. In same manner as that of the conventional apparatus, in the normal operation, NC 1 sends a control command from the driver 7 to the common receiving line 2 in every control cycle. The numerically controlled drive units 4, 5, 6 read a control command allotted to the units with the receivers 12, 13, 14, so that the motors 15, 16, 17 are respectively controlled.

The numerically controlled drive units 4, 5, 6 detect a position, speed and electric current. These detected position, speed and electric current are used as detection data. A warning and an alarm are used as diagnosis data. The data is sent from the drivers 9, 10, 11 to the common sending line 3. The data is sent to NC 1 from each numerically controlled drive unit being scheduled so that the interference of data can be prevented.

NC 1 receives the data by the receiver 8 so as to use the data as a control command of the successive control cycle, or alternatively an alarm and a warning are displayed and processed.

In this embodiment, there is provided a dedicated communication line 30 different from the common communication lines 2 and 3. The receivers 24, 25, 26 and the drivers 27, 28, 29 are connected with the dedicated communication line 30. Therefore, the receivers and drivers can communicate with each other without using NC 1, and further monitoring can be directly conducted and data can be sent at any time irrespective of the control cycle of NC 1.

Since the numerically controlled drive units 4, 5, 6 are controlled and driven at a higher speed than the speed determined by the control cycle of NC 1, the numerically controlled drive units can process the data and then they can be synchronized with each other before the successive control cycle of NC 1.

Seventh Embodiment

Figure 6:
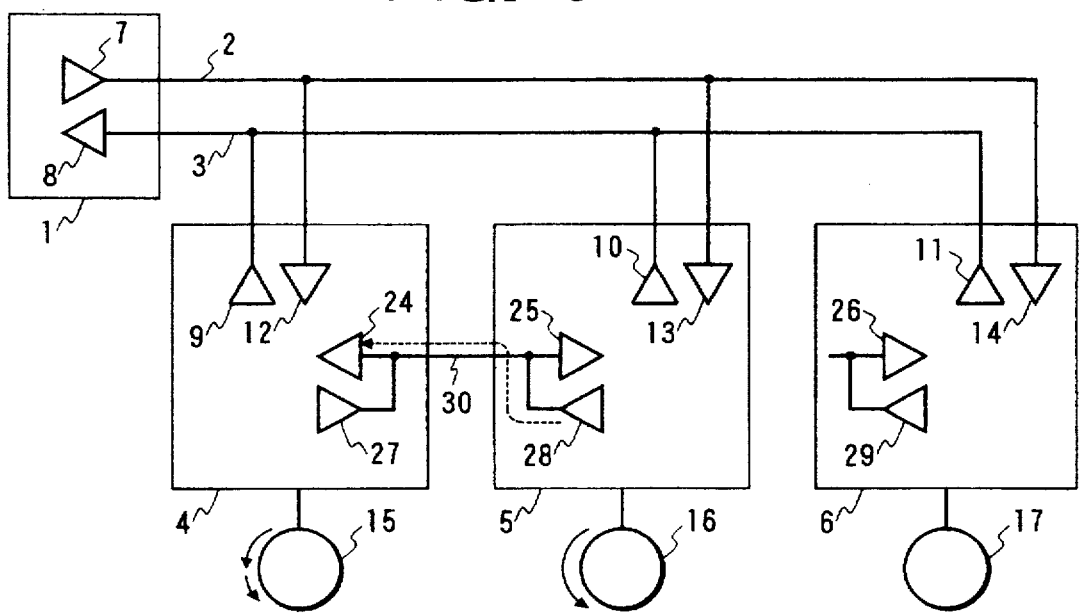
FIG. 6 is an arrangement view of the system in which the numerically controlled drive unit of the seventh embodiment of the present invention is used.

FIG. 6 is a schematic illustration of the apparatus of the seventh embodiment. In this system arrangement, for the purpose of synchronous operation of the numerically controlled drive units 4 and 5, the dedicated communication line illustrated in the arrangement view of the sixth embodiment is provided only between the numerically controlled drive units 4 and 5.

The numerically controlled drive unit 4 reads the detection data of an amount of control of the numerically controlled drive unit 5 by the receiver 24 connected with the dedicated communication line 30 irrespective of the control cycle of NC 1. The flow of data is shown by a broken line in FIG. 6.

The numerically controlled drive unit 4 compares the data of the numerically controlled drive unit 5, which has been read, with the data of an amount of control of its own, and controls the motor 15 so that an error of synchronizing operation between the numerically controlled drive units 4 and 5 can be corrected.

Since this series of processing is conducted in one control cycle of NC 1, the numerically controlled drive units 4 and 5 can be synchronously operated at high speed with high accuracy.

This embodiment is characterized as follows. When the motor of the monitor drive unit quickly responds with respect to the drive unit to be monitored in the sixth embodiment, the monitor drive unit conducts a synchronous correcting operation, so that an accurate correcting operation can be realized at high speed.

Eighth Embodiment

Figure 7:
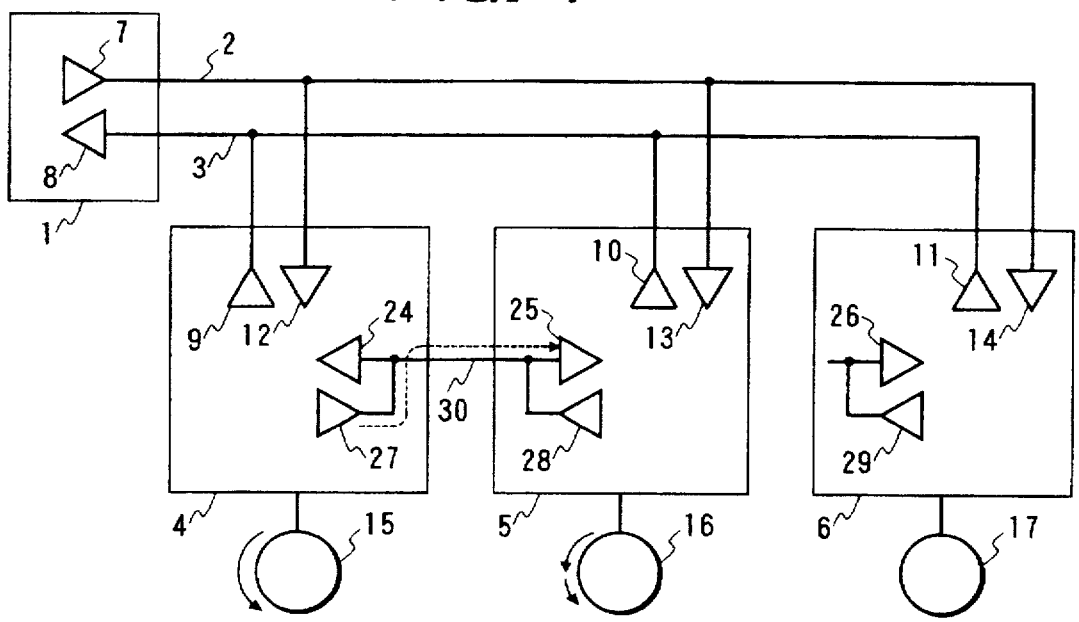
FIG. 7 is an arrangement view of the system in which the numerically controlled drive unit of the eighth embodiment of the present invention is used.
Figure 12:
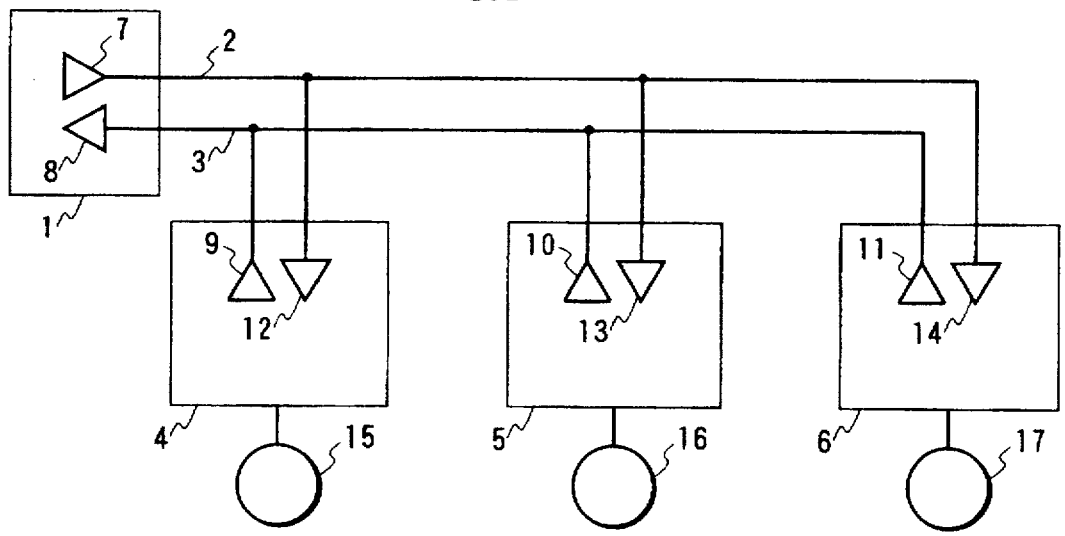
FIG. 12 is an arrangement view of the system in which the numerically controlled drive unit of the prior art is used.

FIG. 7 is a schematic illustration of the apparatus of the eighth embodiment. In this system arrangement, the numerically controlled drive units 4 and 5 are operated synchronously with each other, and the numerically controlled drive unit 4 is a master drive unit and the numerically controlled drive units 5 is a slave drive unit. From the viewpoint of an arrangement view, FIG. 7 is the same as the arrangement view of the seventh embodiment.

When an error between the control command and the amount of control of the numerically controlled drive unit 4 is increased by some reasons, for example, when an error between the control command and the amount of control of the numerically controlled drive unit 4 is increased by a heavy impact load, it is natural that a synchronization error between the numerically controlled drive units 4 and 5 is increased.

The numerically controlled drive unit 4 estimates a synchronization error generated by the error between its control command and the detection data of an amount of control, and sends a correction control command with respect to the numerically controlled drive unit 5 to the dedicated communication line 30 by the driver 27 irrespective of the control cycle of NC 1.

The numerically controlled drive unit 5 reads a control command that has appeared on the dedicated communication line 30 by the receiver 25, and controls the motor 16 by the correction control command. The flow of data is shown by a broken line in FIG. 7.

Since this series of processing is conducted in one control cycle of NC 1, the numerically controlled drive units 4 and 5 can be synchronously operated at high speed with high accuracy.

In the seventh embodiment, the monitor drive unit that has received the detection data conducts a computation of synchronizing correction and then carries out a correcting processing operation. Accordingly, a heavy processing load is given to the monitor drive unit. However, in this embodiment, the numerically controlled drive unit 4 on the sending side estimates a synchronization error generated by the error between its control command and the detection data of the amount of control, and sends a correction control command. Accordingly, it is not necessary to conduct a synchronizing correcting computation in the numerically controlled drive unit 5 on the receiving side. Therefore, the processing load can be reduced lighter than that of the seventh embodiment.

Ninth Embodiment

Figure 8:
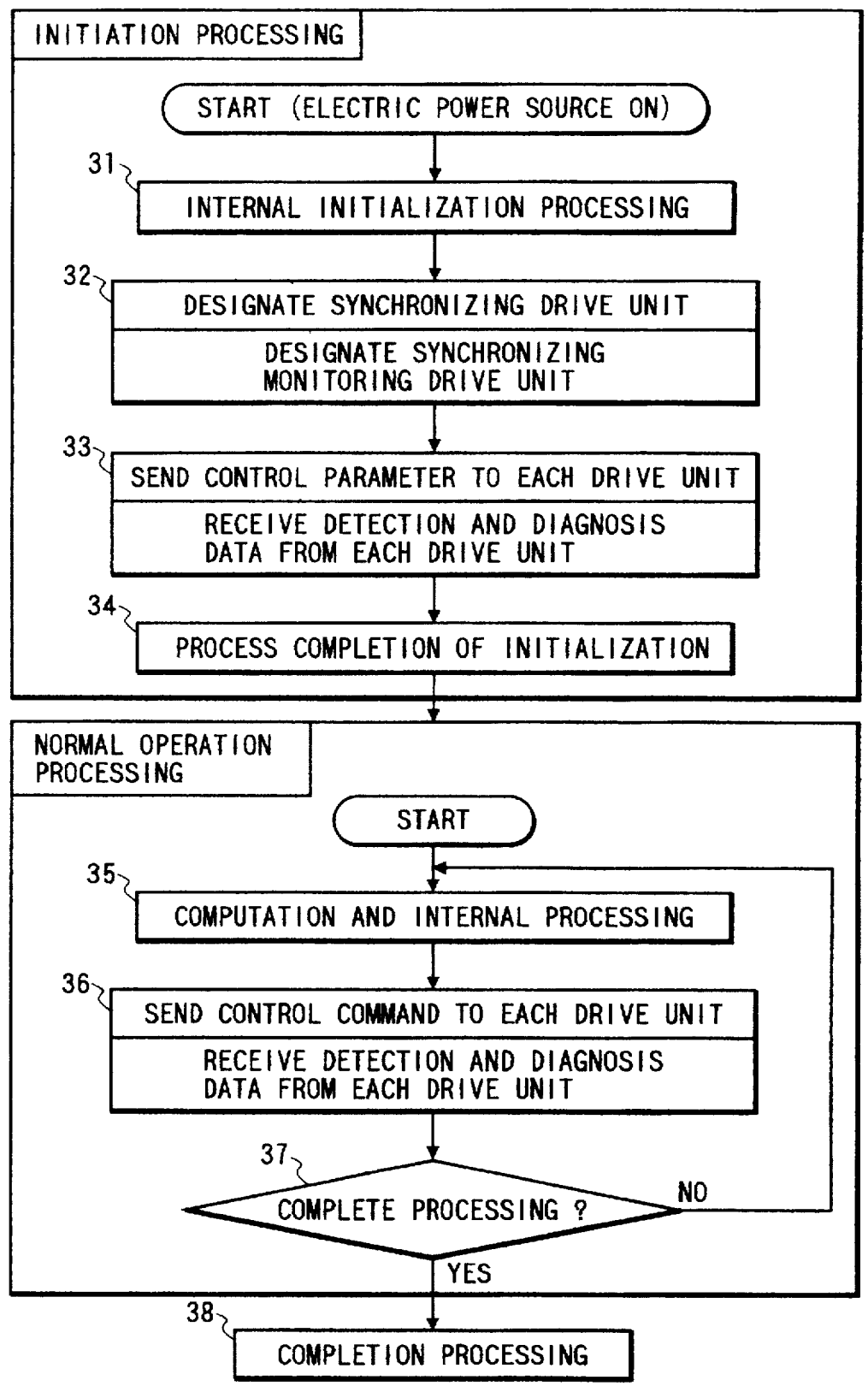
FIG. 8 is a control flow chart of the system in which the numerically controlled drive unit of the ninth embodiment of the present invention is used.

This embodiment is composed as follows. In the second and seventh embodiments, the monitoring numerically controlled drive unit and the numerically controlled drive unit to be monitored are designated in the process of initialization. In the normal operation, in accordance with the designation determined in the process of initialization, the synchronizing correction processing is conducted. This operation is explained with reference to the control flow chart of NC 1 shown in FIG. 8.

When the electric power supply is turned on, the initialization processing is started. After the completion of the initialization processing 31 conducted in NC 1, the synchronizing drive unit is designated, and the synchronizing monitoring drive unit is also designated in step 32.

In the systems of the second and seventh embodiments, the numerically controlled drive unit 5 is set to be a drive unit to be monitored, and the numerically controlled drive unit 4 is set to be a monitoring drive unit.

Then, NC 1 conducts the step 33 of control parameter sending processing on the numerically controlled drive units 4, 5, 6. In this case, the step 33 of control parameter sending processing includes the conventional control parameters and the designation of the monitoring drive unit and the designation of the drive unit to be monitored. At this time, NC 1 receives the detection data of an amount of control and the diagnosis data immediately sent from the numerically controlled drive units 4, 5, 6.

After that, step 34 of the completion of initialization is carried out. In this way, the initialization processing is completed. Due to the foregoing, the numerically controlled drive units 4, 5, 6 also complete the initialization processing.

Next, the process gets into the phase of normal operation. NC 1 conducts computation and internal processing 35, so that control commands to the numerically controlled drive units 4, 5, 6 can be made and the control command sending processing 36 is conducted on each numerically controlled drive unit. At this time, NC 1 receives the detection data of an amount of control and the diagnosis data immediately sent from the numerically controlled drive units 4, 5, 6.

In the normal operation, as long as the completion of processing is not requested (step 37), the processing is cyclically continued (control cycle). In this period of time, the numerically controlled drive units 4, 5, 6 maintain a relation of the monitoring drive unit and the drive unit to be monitored which are designated in the process of initialization, and conduct the operation described in the second and seventh embodiments.

This embodiment is characterized as follows. When the apparatus is operated according to a fixed program or when the response properties of motors to be operated synchronously with each other are different, a numerically controlled drive unit in which an error tends to occur between the control command sent from NC 1 and the amount of control is set to be a drive unit to be monitored in the process of initialization. Due to the foregoing, the synchronizing correction can be easily realized at high speed with high accuracy in the second and seventh embodiments.

Tenth Embodiment

Figure 9:
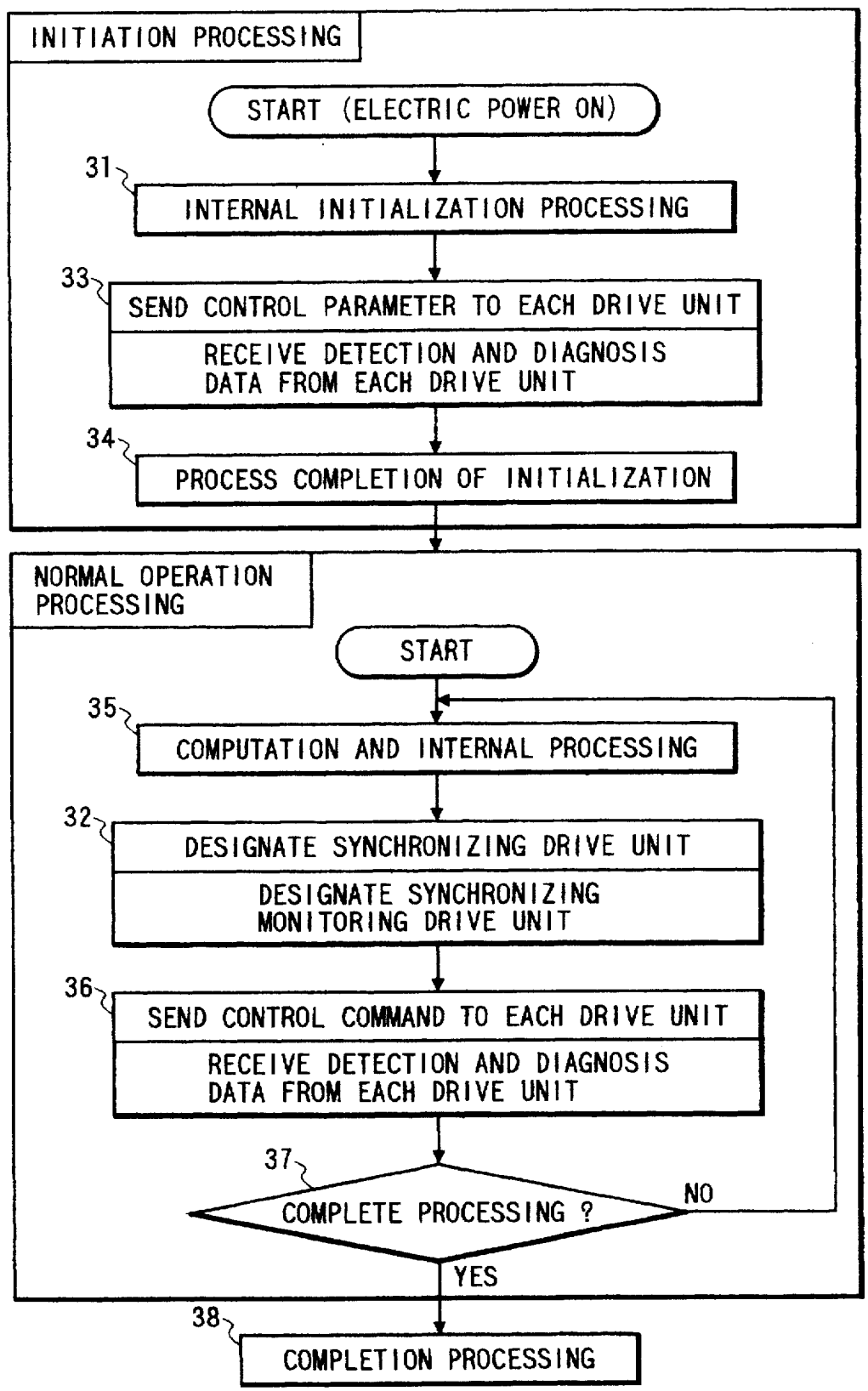
FIG. 9 is a control flow chart of the system in which the numerically controlled drive unit of the tenth embodiment of the present invention is used.

This embodiment is composed as follows. In the second and seventh embodiments, the monitoring numerically controlled drive unit and the numerically controlled drive unit to be monitored are not designated in the process of initialization, but they are designated in every control cycle of the normal operation so as to conduct a synchronization correction processing. Referring to the control flow chart of NC 1 shown in FIG. 9, this embodiment will be explained below.

When the electric power supply is turned on, the initialization processing is started in the same manner as that of the conventional processing, and the successive steps described below are sequentially carried out. That is, the successive steps are: the internal initialization processing 31; the sending of the control parameter to each numerically controlled drive unit, and the receiving of the detection data of an amount of control from each numerically controlled drive unit and also the receiving of the diagnosis data; and the initialization completion processing 34.

In the normal operation processing, the computation and internal processing 35 is conducted, and then the designation 32 of the synchronizing drive unit and the monitoring synchronizing drive unit is conducted.

Due to the above processing, in the second and seventh embodiments, the numerically controlled drive unit 5 is set to be a drive unit to be monitored, and the numerically controlled drive unit 4 is set to be a monitoring drive unit.

After that, NC 1 conducts the control command sending processing 36 on each numerically controlled drive unit. At this time, NC 1 conducts the receiving processing of the detection data of an amount of control and the diagnosis data immediately sent from the numerically controlled drive units 4, 5, 6.

This processing in the normal operation is cyclically continued (control cycle) as long as the completion of processing is not requested (step 37). Accordingly, in this period of time, the numerically controlled drive units 4, 5, 6 are set to be a monitoring drive unit and a drive unit to be monitored in every control cycle and conduct the operation described in the second and seventh embodiments.

With respect to the ninth embodiment, this embodiment is characterized as follows. When the operating condition of each numerically controlled drive unit is not changed by a fixed program but changed by an arbitrary program, or alternatively when an error between the control command and the amount of control is increased by some reasons, for example, when a heavy impact is given, the designation of a monitoring drive unit and a drive unit to be monitored is changed, so that the synchronization error can be corrected at high speed with high accuracy.

Eleventh Embodiment

Figure 10:
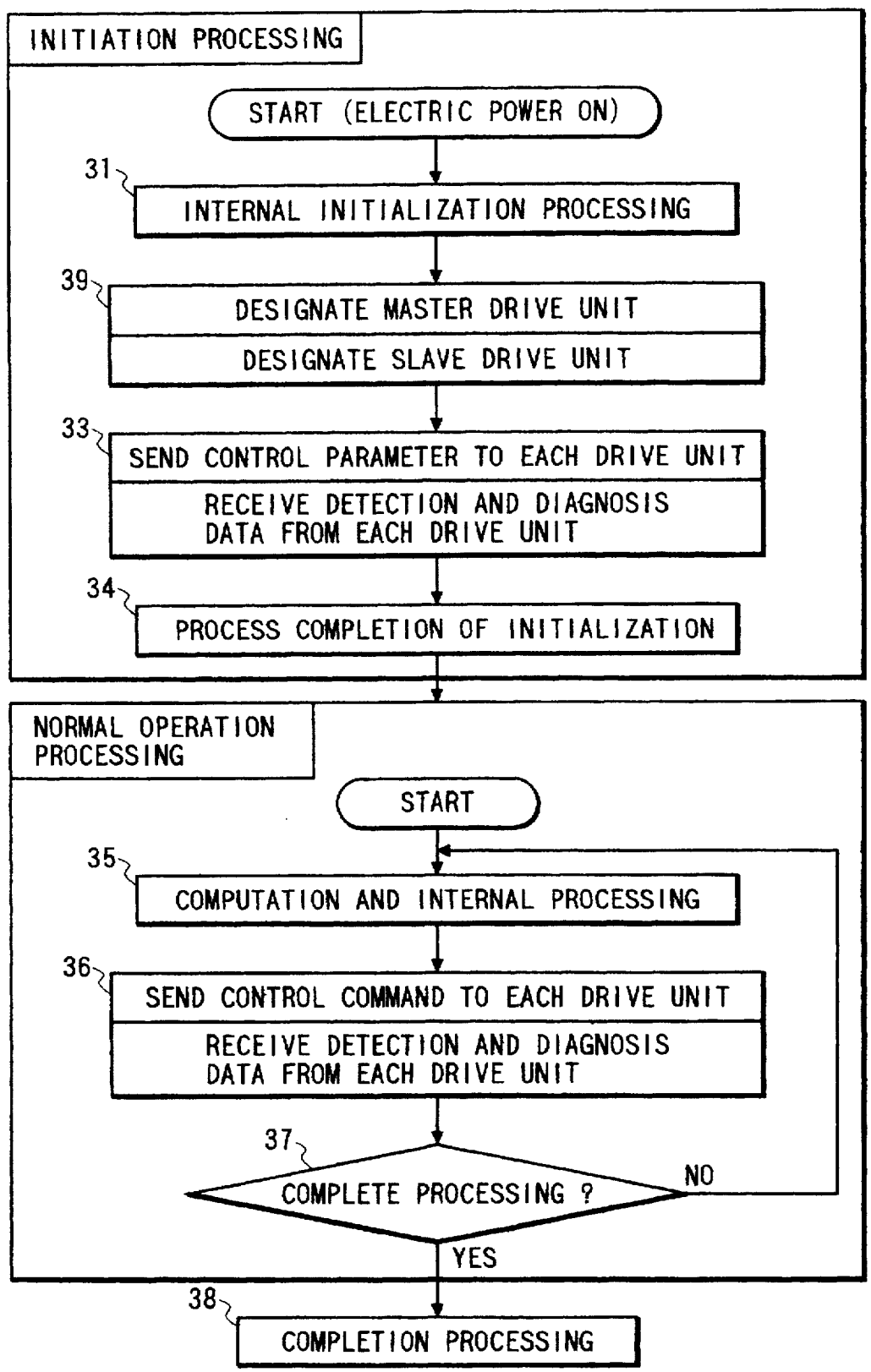
FIG. 10 is a control flow chart of the system in which the numerically controlled drive unit of the eleventh embodiment of the present invention is used.

In this embodiment, the operation is conducted as follows. In the third, fifth and eighth embodiments, the master and slave numerically controlled drive units are designated in the process of initialization, and the designation determined in the process of initialization is fixed in the normal operation, and the synchronization correction processing is conducted. This embodiment will be explained with reference to the control flow chart of NC 1 shown in FIG. 10.

When the electric power supply is turned on, the initialization processing is started. After the completion of the processing 31 conducted inside the NC 1, the designation 39 of a master drive unit and slave drive unit is conducted.

Due to the foregoing processing, in the systems of the third, fifth and eighth embodiments, the numerically controlled drive unit 4 is designated as a master drive unit, and the numerically controlled drive unit 5 is designated as a slave drive unit.

Then, NC 1 conducts the control parameter sending processing 33, which includes the conventional parameters and the designation of the master and slave drive units, on the numerically controlled drive units 4, 5, 6. At this time, NC 1 conducts the receiving processing to receive the detection data of an amount of control and the diagnosis data immediately sent from the numerically controlled drive units 4, 5, 6.

Then the initialization completion processing 34 is conducted, and the initialization processing is completed. In accordance with that, the numerically controlled drive units 4, 5, 6 also complete the initialization processing.

Next, the process gets into the phase of normal operation. NC 1 conducts the computation and internal processing 35, and control commands to the numerically controlled drive units 4, 5, 6 can be made and the control command sending processing 36 is conducted on each numerically controlled drive unit. At this time, NC 1 receives the detection data of an amount of control and the diagnosis data immediately sent from the numerically controlled drive units 4, 5, 6.

In the normal operation, as long as the completion of processing is not requested (step 37), the processing is cyclically continued (control cycle). In this period of time, the numerically controlled drive units 4, 5, 6 maintain a relation of the master drive unit and the slave drive unit designated in the process of initialization, and conduct the operation described in the third, fifth and eighth embodiments.

This embodiment is characterized as follows. When the apparatus is operated according to a fixed program or when the response properties of motors to be operated synchronously with each other are different, a numerically controlled drive unit in which an error tends to occur between the control command sent from NC 1 and the amount of control is set to be a master drive unit in the process of initialization. Due to the foregoing, a synchronizing correction can be easily realized at high speed with high accuracy in the third, fifth and eighth embodiments.

Twelfth Embodiment

Figure 11:
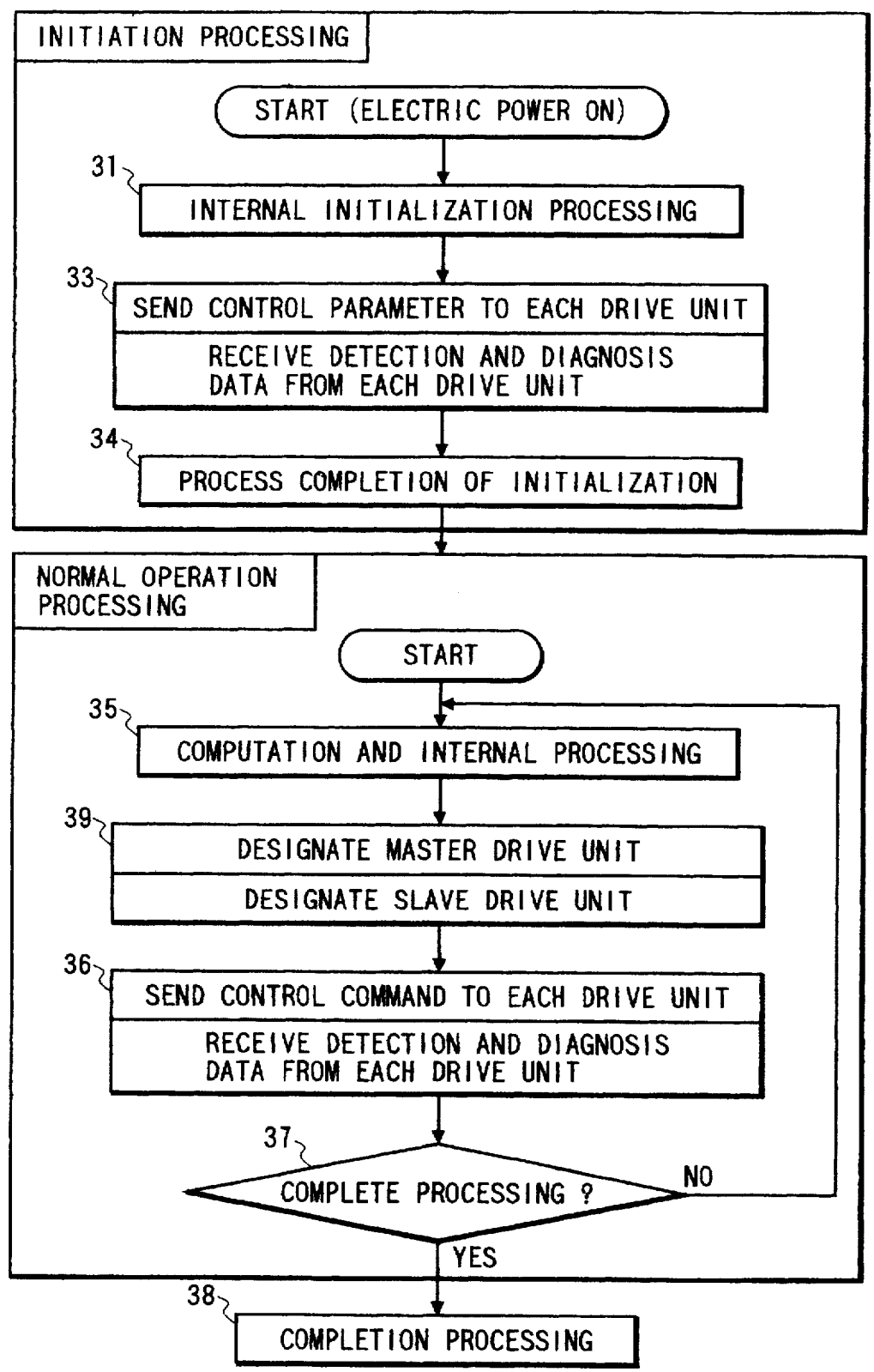
FIG. 11 is a control flow chart of the system in which the numerically controlled drive unit of the twelfth embodiment of the present invention is used.

This embodiment is composed as follows. In the third, fifth and eighth embodiments, the master numerically controlled drive unit and the slave numerically controlled drive unit are not designated in the process of initialization, but they are designated in every control cycle of the normal operation so as to conduct the synchronization correction processing. Referring to the control flow chart of NC 1 shown in FIG. 11, this embodiment will be explained below.

When the electric power supply is turned on, the initialization processing is started in the same manner as that of the conventional processing, and the successive steps described below are sequentially carried out. That is, the successive steps are: the internal initialization processing 31; the sending of the control parameter to each numerically controlled drive unit, and the receiving of the detection data of an amount of control from each numerically controlled drive unit and also the receiving of the diagnosis data; and the initialization completion processing 34.

In the normal operation processing, the computation and internal processing 35 is conducted, and then the designation 39 of the master drive unit and the slave drive unit is conducted.

Due to the above processing, in the systems of the third, fifth and eighth embodiments, the numerically controlled drive unit 5 is designated as a master drive unit and the numerically controlled drive unit 4 is designated as a slave drive unit.

After that, NC 1 conducts the control command sending processing 36 on each numerically controlled drive unit. At this time, NC 1 receives the detection data of an amount of control and the diagnosis data immediately sent from the numerically controlled drive units 4, 5, 6.

In the normal operation, as long as the completion of processing is not requested (step 37), the processing is cyclically continued (control cycle). Accordingly, in this period of time, the master and slave drive units of the numerically controlled drive units 4, 5, 6 are designated in every control cycle, and the operation described in the third, fifth and eighth embodiments is carried out.

For some reasons, for example, when the slave drive unit is given a heavy impact load and the error between the control command and the amount of control is increased, the synchronization error can be reduced by designating the master and slave drive units in a reverse relation.

With respect to the eleventh embodiment, this embodiment is characterized as follows. When the operating condition of each numerically controlled drive unit is not changed by a fixed program but changed by an arbitrary program, or alternatively when the error between the control command and the amount of control is increased by some reasons, for example, when a heavy impact is given, the designation of a master drive unit and a slave drive unit is changed, so that the synchronization error can be corrected at high speed with high accuracy.

As was described above, the method of processing data in a numerically controlled drive unit of the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit; and receiving the detection data sent from other drive control units in accordance with the control period of the numerical control unit, by the numerical control unit through the data receiving line so as to correct a synchronization error caused between the drive control units before the successive control period of the numerical control unit. Accordingly, the method of processing data in accordance with the invention can provide the following effects. The plurality of drive control units exchange the detection data with each other at a higher speed than that of the control period of the numerical control unit. Therefore, it is possible to conduct the synchronizing control between a plurality of drive control units and the monitoring of data with each other in a shorter period than the predetermined control period of the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the data receiving line in accordance with the control period of the numerical control unit, the monitoring unit receives the detection data of the unit to be monitored from the data receiving line, and the monitoring unit compares the received detection data with the detection data of the drive unit controlled by the monitoring unit so as to correct a synchronization error caused between the drive section controlled by the monitoring unit and the drive section controlled by the unit to be monitored. Therefore, the present invention can provide the following effects. The monitoring unit and the unit to be monitored correct a synchronization error at a higher speed than that of the predetermined control period of the numerical control unit. Accordingly, it is possible to conduct the synchronizing control between a plurality of drive control units in a shorter period than the predetermined control period of the numerical control unit.

The present invention is to provide a method of processing data in a numerically controlled drive unit in which at least one drive control unit is made to be a master unit and other drive control units are made to be slave units, the slave units send the detection data of their drive sections to the data receiving line in accordance with the control period of the numerical control unit, the master unit receives the detection data of the slave unit from the data receiving line, and the master unit compares the received detection data with the detection data of the drive unit controlled by the master unit itself, a correction command for correcting a synchronization error caused between the drive section controlled by the master unit and the drive section controlled by the slave unit is sent to the data receiving line in a period of time when a plurality of other drive control units do not send data to the numerical control unit, and the slave unit receives the correction command from the data receiving line so as to correct the synchronization error of the drive unit controlled by the slave unit itself. Accordingly, the correction work is conducted while shares are taken in such a manner that the master unit makes a correction command and the slave unit conducts a correction according to the correction command. Consequently, while the loads given to the master and slave units are being reduced, the synchronizing control between a plurality of drive control units can be conducted in a shorter period than the predetermined control period of the numerical control unit.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command for correcting the synchronization error is sent to the data receiving line irrespective of the control period of the numerical control unit in a period of time when a plurality of drive control units are not sending data to the numerical control unit, and the slave unit receives the correction signal from the data receiving line so as to correct the synchronization error of the drive section controlled by the slave unit itself. Accordingly, the correction can be conducted with an estimated value of the error before the actual synchronization error is generated between the master and the slave unit. Consequently, while a load given to the master unit is being reduced, the synchronizing control between a plurality of drive control units can be conducted in a shorter period than the predetermined control period of the numerical control unit.

The method of processing data in a numerically controlled drive unit comprises the steps of: sending a control command allotted to each drive control unit from the numerical control unit to each drive control unit in every predetermined control period; controlling a drive section of each drive control unit by each drive control unit itself in accordance with the control command allotted to it; and sending the detection data of the drive section to the data receiving line in accordance with the control period of the numerical control unit, wherein a dedicated data line for connecting the data sending section with the data receiving section, which is provided differently from the data line of the numerical control unit, is provided in each drive control unit, so that data can be sent and received by the plurality of drive control units independently from the sending and receiving of data conducted through the data sending line or data receiving line between the numerical control unit and the plurality of drive control units in a predetermined control period of the numerical control unit. Accordingly, the plurality of drive control units exchange the detection data with each other at high speed independently from the sending and receiving of data conducted between the drive control units and the numerical control unit. Therefore, the synchronizing control and the monitoring between a plurality of drive control units can be conducted independently from the predetermined control period of the numerical control unit.

The present invention is to provide a method of processing data in a numerically controlled drive unit in which at least one drive control unit is made to be a unit to be monitored and other drive control units are made to be monitoring units, the unit to be monitored sends the detection data of its drive section to the dedicated data line, the monitoring unit receives the detection data of the unit to be monitored from the dedicated data line, and the monitoring unit compares the received detection data with the detection data of the drive unit controlled by the monitoring unit so as to correct a synchronization error caused between the drive section controlled by the monitoring unit and the drive section controlled by the unit to be monitored. Accordingly, the monitoring unit and the unit to be monitored correct a synchronization error at high speed by the high speed data sending and receiving which is independent from the data sending and receiving conducted between the numerical control unit and the monitoring unit and also between the numerical control unit and the unit to be monitored. Therefore, the synchronizing control between a plurality of drive control units can be conducted at high speed independently from the predetermined control period of the numerical control unit.

The present invention is to provide a method of processing data in a numerically controlled drive unit in which at least one drive control unit is made to be a master unit and other drive control units are made to be slave units, the slave units send the detection data of their drive sections to the dedicated data line, the master unit receives the detection data of the slave unit from the dedicated data line, and the master unit compares the received detection data with the detection data of the drive unit controlled by the master unit itself, a correction command for correcting a synchronization error caused between the drive section controlled by the master unit and the drive section controlled by the slave unit is sent to the dedicated data line, and the slave unit receives the correction command from the dedicated data line so as to correct the synchronization error of the drive unit controlled by the slave unit itself. Accordingly, the correction work is conducted while shares are taken in such a manner that the master unit makes a correction command and the slave unit conducts a correction according to the correction command, so that the synchronization error can be corrected at high speed by the high speed data sending and receiving which is independent from the data sending and receiving conducted between the numerical control unit and the master and slave units. Consequently, while the loads given to the master and the slave unit are reduced, the synchronizing control between a plurality of drive control units can be conducted at high speed independently from the predetermined period of the numerical control unit.

The present invention is to provide a method of processing data in a numerically controlled drive unit in which at least one of the plurality of drive control units is made to be a master unit and other drive control units are made to be slave units, the master unit estimates a synchronization error caused between the drive section controlled by the slave unit and the drive section controlled by the master unit itself from the control command sent from the numerical control unit and the detection data of the drive section controlled by the master unit itself, a correction command for correcting the synchronization error is sent to the dedicated data line, and the slave unit receives the correction signal from the dedicated data line so as to correct the synchronization error of the drive section controlled by the slave unit. Accordingly, the correction can be conducted with an estimated value of the error before the actual synchronization error is generated between the master and the slave unit. Consequently, the synchronization error is corrected at high speed by the high speed data ending and receiving which is independent from the data sending and receiving conducted between the numerical control unit and the master and slave units. Therefore, while the load given to the master unit is being reduced, the synchronizing control between a plurality of drive control units can be independently conducted at high speed in a shorter period than the predetermined control period of the numerical control unit.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit sends the detection data to the data sending line irrespective of a predetermined control period in which the numerical control unit sends a control command to the plurality of drive control units while data is not sent and received between the numerical control unit and the plurality of drive control units in the case where an error caused between a control command sent from the numerical control unit and an amount of control of the drive section controlled by the drive control unit exceeds a predetermined value, and other drive control unit receives the detection data from the data receiving line, and the drive control unit compares the detection data with the detection data of the control section controlled by the drive control unit itself, so that the synchronization error of its drive unit can be corrected. Accordingly, the plurality of drive control units can take the detection data of an opponent drive control unit which is synchronously operated at high speed, irrespective of the predetermined control period in which the numerical control unit sends a control command to the plurality of drive control units. Therefore, the synchronizing control between the plurality of drive control units can be conducted at high speed irrespective of the predetermined control period of the numerical control unit.

The method of processing data in a numerically controlled drive unit in accordance with the present invention comprises the steps of: sending a control command allotted to each drive control unit from the numerical control unit to each drive control unit in every predetermined control period; controlling a drive section of each drive control unit by each drive control unit itself in accordance with the control command allotted to it; sending the detection data of the drive section to the data receiving line in accordance with the control period of the numerical control unit, wherein at least one drive control unit in the plurality of drive control units is made to be a master unit and other drive control units are made to be slave units, the master unit estimates a synchronization error caused between the drive section controlled by the slave unit and the drive section controlled by the master unit itself according to the control command sent from the numerical control unit and the detection data of the drive section controlled by the master unit itself, a correction command to correct this synchronization error is sent to the data sending line irrespective of a predetermined control period in which the numerical control unit sends a control command to the plurality of drive control units and in a period of time in which data is not sent and received between the numerical control unit and the plurality of drive control units, and the slave unit receives the correction command from the data sending line so as to correct the synchronization error of the drive section controlled by the slave unit. Accordingly, before an actual synchronization error is generated between the master and the slave unit, the synchronization error can be corrected at high speed using an estimated value of the error irrespective of the predetermined control period in which the numerical control unit sends a control command to the plurality of drive control units. Therefore, while a load processed by the master unit is being reduced, the synchronizing control between a plurality of drive control units can be conducted at high speed irrespective of the predetermined control period of the numerical control unit.

The present invention is to provide a method of processing data in a numerically controlled drive unit in which the numerical control unit designates a specific drive control unit in the plurality of drive control units as a master unit or a monitor unit in the process of initialization and also designates another specific drive control unit as a slave unit or a unit to be monitored, and a relation between the master unit or monitor unit and the slave unit or unit to be monitored is maintained in a control period of normal operation after the completion of the initialization process. Accordingly, when specific drive control units are once designated as a master unit and a slave unit in the process of initialization, or alternatively when specific drive control units are once designated as a monitoring unit and a unit to be monitored in the process of initialization, the synchronization error can be easily reduced at high speed without a particular controlling operation conducted by the numerical control unit.

The present invention is to provide a method of processing data in a numerically controlled drive unit in which the numerical control unit designates a specific drive control unit in the plurality of drive control units as a master unit or a monitor unit in accordance with a control parameter sent from the numerical control unit to the plurality of drive control units in every control period of normal operation and also designates another specific drive control unit as a slave unit or a unit to be monitored, and a relation between the master unit or the monitor unit and the slave unit or the unit to be monitored is capable of being changed in accordance with the control parameter. Accordingly, specific drive control units are designated by the control parameter as a master unit and a slave unit, or alternatively specific drive control units are designated by the control parameter as a monitoring unit and a unit to be monitored. Therefore, a relation between the master and the slave unit, or a relation between the monitoring unit and the unit to be monitored can be arbitrarily changed, so that the synchronizing control can be conducted at high speed with high accuracy.

While some specific embodiments have been described, it should be understood that the present invention is not limited to those embodiments, but may variously be modified, altered and changed within the scope of the present invention.

What is claimed is:

1. A method of processing data in a numerically controlled drive unit including at least one numerical control unit and a plurality of drive control units which have a data receiving section commonly connected with a data sending line through which data is sent from said numerical control unit and also have a data sending section and a data receiving section commonly connected with a data receiving line through which data is received by said numerical control unit, said method comprising the steps of:

sending a control command allotted to each drive unit from said numerical control unit to each drive unit through said data sending line in every predetermined control period;

controlling a drive section of each drive control unit by each drive control unit itself in accordance with the control command allotted to it;

sending detection data of said drive section, said detection data representing a response of said drive section to said control command, to said data receiving line in accordance with the control period of said numerical control unit; and receiving the detection data by one control unit sent from other drive control units in accordance with the control period of said numerical control unit, through said data receiving line so as to correct a synchronization error caused between said drive control units before the successive control period of said numerical control unit, wherein said data sending line is separate from said data receiving line.

2. A method of processing data in a numerically controlled drive unit including at least one numerical control unit and a plurality of drive control units which have a data receiving section commonly connected with a data sending line through which data is sent from said numerical control unit and also have a data sending section and a data receiving section commonly connected with a data receiving line through which data is received by said numerical control unit, said method comprising the steps of:

sending a control command allotted to each drive unit from said numerical control unit to each drive unit in every predetermined control period;

controlling a drive section of each drive control unit by each drive control unit itself in accordance with the control command allotted to it;

sending the detection data of said drive section to said data receiving line in accordance with the control period of said numerical control unit; and receiving the detection data sent from other drive control units in accordance with the control period of said numerical control unit, by said numerical control unit through said data receiving line so as to correct a synchronization error caused between said drive control units before the successive control period of said numerical control unit, wherein at least one drive control unit is made to be a unit to be monitored and other drive control units are made to be monitoring units, the unit to be monitored sends the detection data of its drive section to said data receiving line in accordance with the control period of said numerical control unit, said monitoring unit receives the detection data of the unit to be monitored from said data receiving line, and said monitoring unit compares the received detection data with the detection data of said drive unit controlled by said monitoring unit so as to correct a synchronization error caused between said drive section controlled by said monitoring unit and said drive section controlled by the unit to be monitored.

3. A method of processing data in a numerically controlled drive unit according to claim 1, wherein at least one drive control unit is made to be a master unit and other drive control units are made to be slave units, said slave units send the detection data of their drive sections to said data receiving line in accordance with the control period of the numerical control unit, said master unit receives the detection data of said slave unit from said data receiving line, and said master unit compares the received detection data with the detection data of said drive unit controlled by said master unit itself, a correction command for correcting a synchronization error caused between said drive section controlled by said master unit and said drive section controlled by said slave unit is sent to said data receiving line in a period of time when a plurality of other drive control units do not send data to said numerical control unit, and said slave unit receives the correction command from said data receiving line so as to correct the synchronization error of said drive unit controlled by said slave unit itself.

4. A method of processing data in a numerically controlled drive unit including at least one numerical control unit and a plurality of drive control units which have a data receiving section commonly connected with a data sending line through which data is sent from said numerical control unit and also have a data sending section and a data receiving section commonly connected with a data receiving line through which data is received by said numerical control unit, said method comprising the steps of:

sending a control command allotted to each drive control unit from said numerical control unit to each drive control unit in every predetermined control period;

controlling a drive section of each drive control unit by each drive control unit itself in accordance with the control command allotted to it;

sending detection data of said drive section, said detection data representing a response of said drive section to said control command, to said data receiving line in accordance with the control period of said numerical control unit, wherein at least one drive control unit is made to be a master unit and other drive control units are made to be slave units, said master unit estimates a synchronization error caused between said drive section controlled by said slave unit and said drive section controlled by said master unit itself according to the control command sent from said numerical control unit and the detection data of said drive section controlled by said master unit itself, a correction command for correcting the synchronization error is sent to said data receiving line irrespective of the control period of said numerical control unit in a period of time when a plurality of drive control units are not sending data to said numerical control unit, and said slave unit receives the correction signal from said data receiving line so as to correct the synchronization error of said drive section controlled by said slave unit itself.

5. A method of processing data in a numerically controlled drive unit including at least one numerical control unit and a plurality of drive control units which have a data receiving section commonly connected with a data sending line through which data is sent from said numerical control unit and also have a data sending section commonly connected with a data receiving line through which data is received by said numerical control unit, said method comprising the steps of:

sending a control command allotted to each drive control unit from the numerical control unit to each drive control unit in every predetermined control period;

controlling a drive section of each drive control unit by each drive control unit itself in accordance with the control command allotted to it; and sending detection data of the drive section, said detection data representing a response of said drive section to said control command, to the data receiving line in accordance with the control period of the numerical control unit, wherein a dedicated data line for connecting the data sending section with the data receiving section, which is provided differently from the data line of said numerical control unit, is provided in each drive control unit, so that data can be sent and received by said plurality of drive control units independently from the sending and receiving of data conducted through one of said data sending line and data receiving line between said numerical control unit and said plurality of drive control units in a predetermined control period of said numerical control unit.

6. A method of processing data in a numerically controlled drive unit including at least one numerical control unit and a plurality of drive control units which have a data receiving section commonly connected with a data sending line through which data is sent from said numerical control unit and also have a data sending section commonly connected with a data receiving line through which data is received by said numerical control unit, said method comprising the steps of:

sending a control command allotted to each drive control unit from the numerical control unit to each drive control unit in every predetermined control period;

controlling a drive section of each drive control unit by each drive control unit itself in accordance with the control command allotted to it; and sending the detection data of the drive section to the data receiving line in accordance with the control period of the numerical control unit, wherein a dedicated data line for connecting the data sending section with the data receiving section, which is provided differently from the data line of said numerical control unit, is provided in each drive control unit, so that data can be sent and received by said plurality of drive control units independently from the sending and receiving of data conducted through one of said data sending line and data receiving line between said numerical control unit and said plurality of drive control units in a predetermined control period of said numerical control unit, wherein at least one drive control unit is made to be a unit to be monitored and other drive control units are made to be monitoring units, the unit to be monitored sends the detection data of its drive section to said dedicated data line, said monitoring unit receives the detection data of the unit to be monitored from said dedicated data line, and said monitoring unit compares the received detection data with the detection data of said drive unit controlled by the monitoring unit so as to correct a synchronization error caused between said drive section controlled by said monitoring unit and said drive section controlled by the unit to be monitored.

7. A method of processing data in a numerically controlled drive unit according to claim 5, wherein at least one drive control unit is made to be a master unit and other drive control units are made to be slave units, said slave units send the detection data of their drive sections to said dedicated data line, said master unit receives the detection data of said slave unit from said dedicated data line, and said master unit compares the received detection data with the detection data of said drive unit controlled by said master unit itself, a correction command for correcting a synchronization error caused between said drive section controlled by said master unit and said drive section controlled by said slave unit is sent to said dedicated data line, and said slave unit receives the correction command from said dedicated data line so as to correct the synchronization error of said drive unit controlled by said slave unit itself.

8. A method of processing data in a numerically controlled drive unit according to claim 5, wherein at least one of said plurality of drive control units is made to be a master unit and other drive control units are made to be slave units, said master unit estimates a synchronization error caused between said drive section controlled by said slave unit and said drive section controlled by said master unit itself from said control command sent from said numerical control unit and the detection data of said drive section controlled by said master unit itself, a correction command for correcting the synchronization error is sent to said dedicated data line, and said slave unit receives the correction signal from said dedicated data line so as to correct the synchronization error of said drive section controlled by said slave unit.

9. A method of processing data in a numerically controlled drive unit including at least one numerical control unit and a plurality of drive control units which have a data sending and a data receiving section commonly connected with a data sending line through which data is sent from said numerical control unit and also have a data sending section commonly connected with a data receiving line through which data is received by said numerical control unit, said method comprising the steps of:

sending a control command allotted to each drive control unit from said numerical control unit to each drive control unit in every predetermined control period;

controlling a drive section of each drive control unit by each drive control unit itself in accordance with the control command allotted to it;

sending the detection data of said drive section to said data receiving line in accordance with the control period of said numerical control unit, wherein at least one drive control unit sends the detection data to said data sending line irrespective of a predetermined control period in which said numerical control unit sends a control command to said plurality of drive control units while data is not sent and received between said numerical control unit and said plurality of drive control units in the case where an error caused between a control command sent from said numerical control unit and an amount of control of said drive section controlled by said drive control unit exceeds a predetermined value, and other drive control unit receives the detection data from said data receiving line, and said drive control unit compares the detection data with the detection data of said control section controlled by said drive control unit itself.

10. A method of processing data in a numerically controlled drive unit including at least one numerical control unit and a plurality of drive control units which have a data sending and a data receiving section commonly connected with a data sending line through which data is sent from said numerical control unit and also have a data sending section commonly connected with a data receiving line through which data is received by said numerical control unit, said method comprising the steps of:

sending a control command allotted to each drive control unit from said numerical control unit to each drive control unit in every predetermined control period;

controlling a drive section of each drive control unit by each drive control unit itself in accordance with the control command allotted to it;

sending detection data of said drive section, said detection data representing a response of said drive section to said control command, to said data receiving line in accordance with the control period of said numerical control unit, wherein at least one drive control unit in said plurality of drive control units is made to be a master unit and other drive control units are made to be slave units, said master unit estimates a synchronization error caused between said drive section controlled by said slave unit and said drive section controlled by said master unit itself according to the control command sent from said numerical control unit and the detection data of said drive section controlled by said master unit itself, a correction command to correct this synchronization error is sent to said data sending line irrespective of a predetermined control period in which the numerical control unit sends a control command to said plurality of drive control units and in a period of time in which data is not sent and received between said numerical control unit and said plurality of drive control units, and said slave unit receives the correction command from said data sending line so as to correct the synchronization error of said drive section controlled by said slave unit.

11. A method of processing data in a numerically controlled drive unit according to claim 2 or 6, wherein said numerical control unit designates a specific drive control unit in said plurality of drive control units as a master unit or a monitor unit in the process of initialization and also designates another specific drive control unit as a slave unit or a unit to be monitored, and a relation between said master unit or monitor unit and said slave unit or unit to be monitored is maintained in a control period of normal operation after the completion of the initialization process.

12. A method of processing data in a numerically controlled drive unit according to claim 2 or 6, wherein said numerical control unit designates a specific drive control unit in said plurality of drive control units as a master unit or a monitor unit in accordance with a control parameter sent from said numerical control unit to said plurality of drive control units in every control period of normal operation and also designates another specific drive control unit as a slave unit or a unit to be monitored, and a relation between said master unit or said monitor unit and said slave unit or the unit to be monitored is capable of being changed in accordance with the control parameter.

13. A method of processing data in a numerically controlled drive unit according to claim 3, 4, 7, 8 or 10, wherein said numerical control unit designates a specific drive control unit in said plurality of drive control units as a master unit or a monitor unit in the process of initialization and also designates another specific drive control unit as a slave unit or a unit to be monitored, and a relation between said master unit or monitor unit and said slave unit or unit to be monitored is maintained in a control period of normal operation after the completion of the initialization process.

14. A method of processing data in a numerically controlled drive unit according to claim 3, 4, 7, 8 or 10, wherein said numerical control unit designates a specific drive control unit in said plurality of drive control units as a master unit or a monitor unit in accordance with a control parameter sent from said numerical control unit to said plurality of drive control units in every control period of normal operation and also designates another specific drive control unit as a slave unit or a unit to be monitored, and a relation between said master unit or said monitor unit and said slave unit or the unit to be monitored is capable of being changed in accordance with the control parameter.

* * * * *